(12) United States Patent
Liu (10) Patent No.: US 11,393,415 B2
(45) Date of Patent: Jul. 19, 2022

(54) LIQUID CRYSTAL DISPLAY DEVICE (71) Applicant: WUHAN CHINA STAR OPTOELECTRONICS TECHNOLOGY CO., LTD., Hubei (CN)

(72) Inventor: Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 169 days.

(21) Appl. No.: 16/652,304

(22) PCT Filed: Mar. 4, 2020

(86) PCT No.: PCT/CN2020/077777
§ 371 (c)(1),
(2) Date: Mar. 30, 2020

(87) PCT Pub. No.: WO2020/248631
PCT Pub. Date: Dec. 17, 2020

(65) Prior Publication Data
US 2021/0407440 A1 Dec. 30, 2021

(30) Foreign Application Priority Data

Jun. 10, 2019 (CN) .......................... 201910498190.7
Oct. 30, 2019 (CN) .......................... 201911048000.8

(51) Int. Cl.
*G09G 3/34* (2006.01)
*G02F 1/1335* (2006.01)
(Continued)

(52) U.S. Cl.
CPC ......... *G09G 3/3426* (2013.01); *G02F 1/1339* (2013.01); *G02F 1/1368* (2013.01); *G02F 1/133514* (2013.01); *G02F 1/133528* (2013.01); *G02F 1/133603* (2013.01); *G02F 1/133612* (2021.01); *G02F 1/133621* (2013.01); *G09G 3/3413* (2013.01); *G09G 3/3648* (2013.01); *G09G 2300/0443* (2013.01);
(Continued)

(58) Field of Classification Search
CPC .. G09G 3/3426; G09G 3/3413; G09G 3/3648; G09G 2300/0443; G09G 2300/0809; G09G 2310/0232; G09G 2320/0233; G02F 1/133612; G02F 1/133514; G02F 1/133528; G02F 1/133603; G02F 1/133621; G02F 1/1339; G02F 1/1368
See application file for complete search history.

(56) References Cited

U.S. PATENT DOCUMENTS

2018/0113566 A1* 4/2018 Shigemori .......... G06F 3/04186

* cited by examiner

*Primary Examiner* — Kenneth B Lee, Jr.

(57) ABSTRACT

A liquid crystal display device includes a liquid crystal display panel and a backlight module. The backlight module includes a backlight module body, a first light source component, and a second light source component. The backlight module body is provided with a first opening. The first light source component is disposed on the backlight module body and corresponds to the first opening. When the liquid crystal display panel is displaying, the first light source sequentially emits red light, green light, and blue light to an area of the liquid crystal display panel corresponding to the first opening.

19 Claims, 6 Drawing Sheets

(51) Int. Cl.
*G02F 1/13357* (2006.01)
*G02F 1/1339* (2006.01)
*G02F 1/1368* (2006.01)
*G09G 3/36* (2006.01)

(52) U.S. Cl.
CPC ............... *G09G 2300/0809* (2013.01); *G09G 2310/0232* (2013.01); *G09G 2320/0233* (2013.01)

LIQUID CRYSTAL DISPLAY DEVICE

This application claims the priority of China Patent Application serial No. 201911048000.8, filed Oct. 30, 2019, titled "LIQUID CRYSTAL DISPLAY DEVICE", the disclosures of which are incorporated herein by reference in their entirety.

BACKGROUND OF INVENTION

1. Field of Invention

The present invention relates to a technical field of displays, and particularly to, a liquid crystal display device.

2. Related Art

With development of liquid crystal display technology, particularly development of full-screen technology, most manufacturers currently still set openings facing inward on backlight modules of display devices for corresponding placement of under-screen cameras, thereby to receive incident light from an external environment.

In conventional display devices, when under-screen cameras are correspondingly disposed below openings of backlight modules in display devices, the openings will only serve as a means for sending and receiving ambient light for the under-screen cameras. Since no light source is provided on inner sides of the openings to provide brightness, when the display devices are in use, areas of the backlight modules in the openings will be in an idle state and cannot have any display effect.

Therefore, it is imperative to provide a liquid crystal display device to solve the above-mentioned technical problem.

SUMMARY OF INVENTION

The present application provides a liquid crystal display device, of which an area corresponding to a camera can display color images.

The present application provides a liquid crystal display device, comprising a liquid crystal display panel comprising an array substrate and a color filter substrate disposed corresponding to each other, and a liquid crystal layer disposed between the array substrate and the color filter substrate, wherein the color filter substrate is provided with a second opening; and a backlight module disposed on a side of the liquid crystal display panel, wherein the backlight module comprises: a backlight module body provided with a first opening corresponding to the second opening; a first light source component disposed on the backlight module body and corresponding to the first opening, wherein the first light source component comprises a light-emitting surface facing an area of the liquid crystal display panel corresponding to the first opening, a first driving circuit board, and a first light source; and a second light source component comprising a second driving circuit board and a second light source; wherein when the liquid crystal display panel is displaying, the first driving circuit board outputs a first driving signal so that the first light source sequentially emits red light, green light, and blue light to the area of the liquid crystal display panel corresponding to the first opening, and the second driving circuit board outputs a second driving signal so that the second light source emits light to the liquid crystal display panel except for the area of the liquid crystal display panel corresponding to the first opening.

In the liquid crystal display device of the present application, the first light source component is annular in shape and comprises a plurality of first sub-light sources spaced apart from each other in sequence, wherein any of the first sub-light sources has a light-emitting surface facing the area of the liquid crystal display panel corresponding to the first opening, and any of the first sub-light sources sequentially emits red light, green light, and blue light to the area of the liquid crystal display panel corresponding to the first opening according to the first driving signal; and the second light source component comprises a plurality of second sub-light sources spaced apart from each other in sequence, wherein any of the second sub-light sources emits white light to the liquid crystal display panel except for the area of the liquid crystal display panel corresponding to the first opening according to the second driving signal.

In the liquid crystal display device of the present application, the area of the liquid crystal display panel corresponding to the first opening has a backlight frequency the same as an image displayed on the liquid crystal display panel except for the area of the liquid crystal display panel corresponding to the first opening.

In the liquid crystal display device of the present application, the first light source component is located on a side of the backlight module body adjacent to the liquid crystal display panel and surrounds an outside of the first opening.

In the liquid crystal display device of the present application, the first opening is a circular hole, light emitted from a center of the light-emitting surface of any of the sub-light sources intersects a center line of the first opening, and any of the sub-light sources has a light output direction intersects a direction perpendicular to a plan corresponding to the liquid crystal display panel to form an angle, wherein the angle satisfies the relationship: $a \le \arctan[(l+r)/h]$, wherein a represents the angle between the light output direction of any of the sub-light sources and the direction perpendicular to the plan corresponding to the liquid crystal display panel, l represents a distance between a center of any of the sub-light sources and a side wall of the backlight module body surrounding the first opening, r represents a radius of the first opening, and h represents a distance between the center of any of the sub-light sources and the liquid crystal display panel.

In the liquid crystal display device of the present application, the first light source component is disposed on a side wall of the backlight module body surrounding the first opening.

In the liquid crystal display device of the present application, the first opening is a circular hole, light emitted from a center of the light-emitting surface of any of the sub-light sources intersects a center line of the first opening, and any of the sub-light sources has a light output direction intersects a direction perpendicular to a plan corresponding to the liquid crystal display panel to form an angle, wherein the angle satisfies the relationship: $a' \le \arctan(l'/h')$, wherein a' represents the angle between the light output direction of any of the sub-light sources and the direction perpendicular to the plan corresponding to the liquid crystal display panel, l' represents a distance between a center of any of the sub-light sources and the center line of the first opening, and h' represents a distance between the center of any of the sub-light sources and the liquid crystal display panel.

In the liquid crystal display device of the present application, the plurality of sub-light sources are tri-color light-emitting diodes provided for sequentially emitting red light, green light, and blue light, or the plurality of sub-light sources comprise a red-light light-emitting diode, a green-light light-emitting diode, and a blue-light light-emitting diode sequentially disposed.

In the liquid crystal display device of the present application, the liquid crystal display device further comprises an upper polarizer and a lower polarizer disposed on two sides of the liquid crystal display panel; a cover disposed on a side of the upper polarizer away from the liquid crystal display; an optical adhesive provided between the cover and the upper polarizer; and a camera disposed on a side of the lower polarizer away from the liquid crystal display panel and corresponding to the first opening; wherein the lower polarizer is provided with a third opening corresponding to the first opening, and the upper polarizer is provided with a fourth opening corresponding to the first opening.

In the liquid crystal display device of the present application, the array substrate comprises a first substrate and a plurality of thin-film transistors and a plurality of pixel electrodes disposed on a side of the first substrate adjacent to the liquid crystal layer, wherein the first substrate comprises a camera area corresponding to the first opening, a display area located outside the camera area, and a sealant area located outside the display area, wherein the pixel electrodes comprise a plurality of first pixel electrodes located at the camera area, the thin-film transistors comprise a plurality of first thin-film transistors located at the sealant area, and each of the first thin-film transistors is electrically connected to at least a corresponding one of the first pixel electrodes.

The present application provides a liquid crystal display device, including a liquid crystal display panel and a backlight module. The backlight module includes a backlight module body, a first light source component, and a second light source component. The backlight module body is provided with a first opening. The first light source component is disposed on the backlight module body and corresponds to the first opening. When the liquid crystal display panel is displaying, the first light source sequentially emits red light, green light, and blue light to an area of the liquid crystal display panel corresponding to the first opening, and the second light source emits light to the liquid crystal display panel except fir the area of the liquid crystal display panel corresponding to the first opening, thereby enabling normal color display in the area of the liquid crystal display device corresponding to the camera, and achieving higher product quality.

DESCRIPTION OF PREFERRED EMBODIMENTS

In order to make the purpose, technical solution, and effect of the present application more clear and definite, the present application is further described in detail below with reference to the accompanying drawings and examples. It should be understood that the specific embodiments described herein are only used to explain the application, and are not used to limit the application.

In conventional display devices, when under-screen cameras are correspondingly disposed below openings of backlight modules in display devices, the openings will only serve as a means for sending and receiving ambient light for the under-screen cameras. Since no light source is provided on inner sides of the openings to provide brightness, when the display devices are in use, areas of the backlight modules in the openings will be in an idle state and cannot provide any display effect. The present application provides the following technical solutions to solve the above-mentioned problems.

Please refer to FIGS. 1-6. A liquid crystal display device includes a liquid crystal display panel 10 and a backlight module 40 disposed on a side of the liquid crystal display panel 10.

The liquid crystal display panel 10 includes an array substrate 11 and a color filter substrate 12 disposed corresponding to each other, and a liquid crystal layer 13 disposed between the array substrate 11 and the color filter substrate 12. The color filter substrate includes a color filter layer 121 configured with a second opening 1211.

The backlight module 40 includes a backlight module body 41, a first light source component 42, and a second light source component (not shown).

In this embodiment, the backlight module 41 includes a first opening 411 corresponding to the second opening 1211.

In this embodiment, the first light source component 42 is disposed on the backlight module body 41 and corresponding to the first opening 411, wherein the first light source component 42 includes a light-emitting surface facing an area of the liquid crystal display panel 10 corresponding to the first opening 411.

In this embodiment, the first light source component 42 includes a first driving circuit board 422 and a first light source. The second light source component includes a second driving circuit board and a second light source.

When the liquid crystal display panel 10 is displaying, the first driving circuit board outputs a first driving signal so that the first light source sequentially emits red light, green light, and blue light to the area of the liquid crystal display panel 10 corresponding to the first opening 411, and the second driving circuit board outputs a second driving signal so that the second light source emits light to the liquid crystal display panel 10 except for the area of the liquid crystal display panel corresponding to the first opening 411.

When the liquid crystal display panel 10 is used to take a picture, the first light source does not emit light, and an external light source enters a camera 70 in the liquid crystal display device over the area corresponding to the first opening 411 for imaging.

The present application provides a liquid crystal display device includes a liquid crystal display panel 10 and a backlight module 40. The backlight module 40 includes a backlight module body 41, a first light source component 42, and a second light source component. The backlight module body 41 is provided with a first opening 411. The first light source component 42 is disposed on the backlight module body 41 and corresponding to the first opening 411. When the liquid crystal display panel 10 is displaying, the first light source emits red light, green light, and blue light in sequence to the area of the liquid crystal display panel 10 corresponding to the first opening 411, and the second light source emits light to the liquid crystal display panel 10 except for the area of the liquid crystal display panel corresponding to the first opening 411. In this manner, normal color display can be realized by an area of the liquid crystal display device corresponding to the camera 70, thereby achieving a greater quality product.

Figure 1:
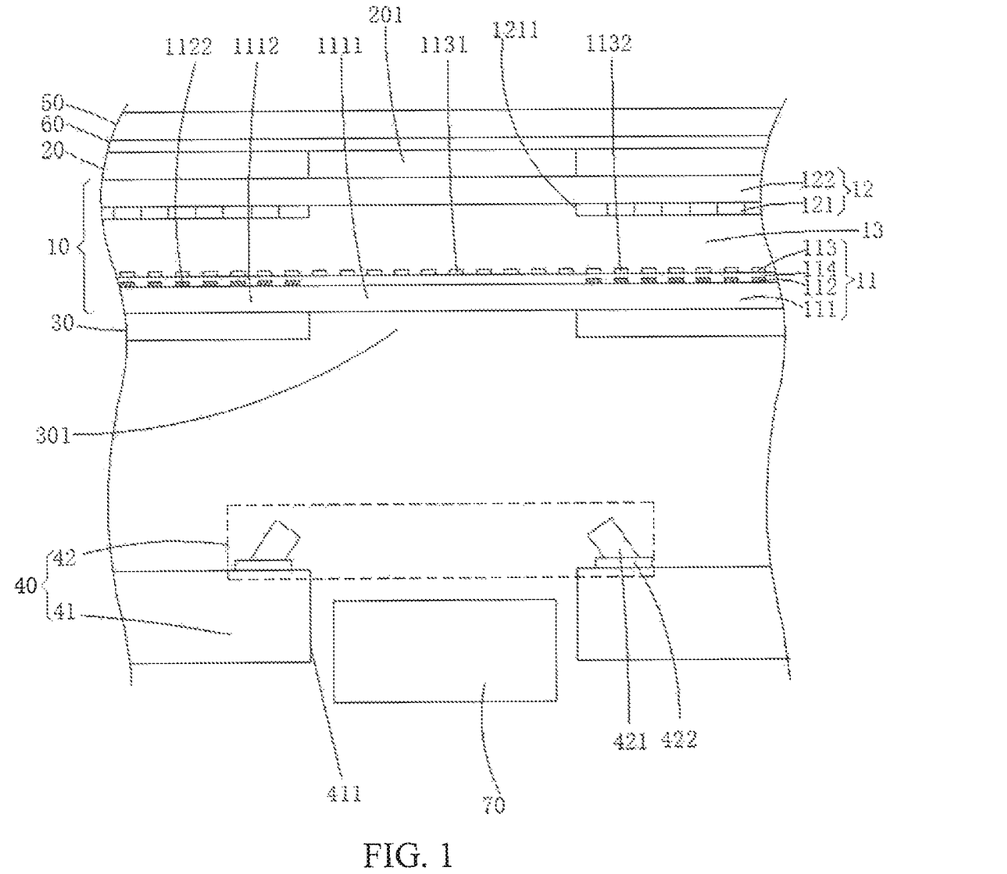
FIG. 1 is a first schematic cross-sectional view of a liquid crystal display device of the present application.
Figure 4:
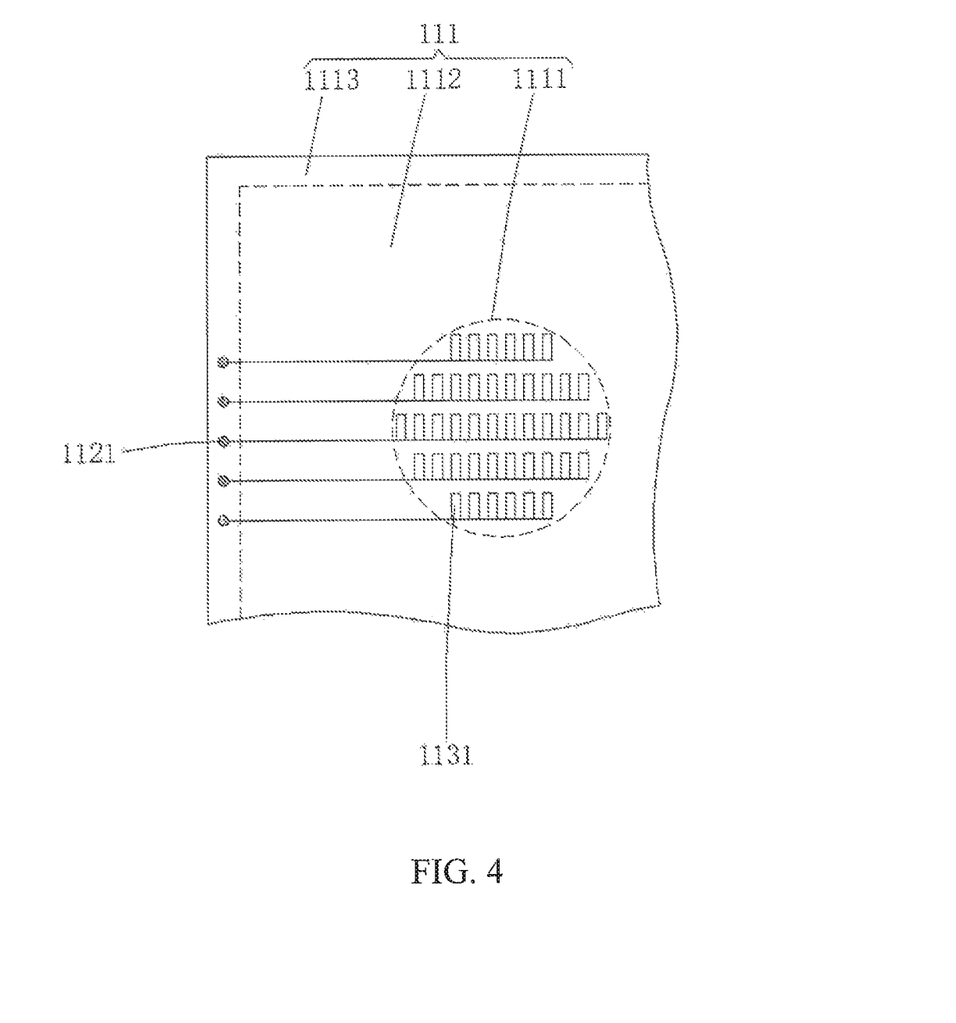
FIG. 4 is a schematic view showing a connection of a plurality of first pixel electrodes with a plurality of thin-film transistor of a liquid crystal display device of the present application.

Please refer to FIGS. 1 and 4. The array substrate 11 includes a first substrate 111, and a plurality of thin-film transistors 112 and a plurality of pixel electrodes 113 disposed on a side of the first substrate 111 adjacent to the liquid crystal layer 13. The first substrate 111 includes a camera area 1111 corresponding to the first opening 411, a display area 1112 located outside the camera area 1111, and a sealant area 1113 located outside the display area 1112. The pixel electrodes 113 include a plurality of first pixel electrodes 1131 located at the camera area 1111, the thin-film transistors 112 include a plurality of first thin-film transistors 1121 located at the sealant area 1113, and each of the first thin-film transistors 1121 is electrically connected to and is provided to drive at least a corresponding one of the first pixel electrodes 1131.

Please refer to FIG. 4. The plurality of first pixel electrodes 1131 are arranged in an array. Each of the first pixel electrodes 1131 is electrically connected to a corresponding one of the first thin-film transistors 1121.

Please refer to FIG. 1. The plurality of pixel electrodes 113 further include a plurality of second pixel electrodes 1132 located in the display area 1112. The plurality of thin-film transistors 112 further include a plurality of second thin-film transistors 1122 located in the display area 1112. Each of the second thin-film transistors 1122 is electrically connected to and provided to drive a corresponding one of the second pixel electrodes 1132.

Please refer to FIG. 1. The array substrate 11 further includes an insulating layer 114. The insulating layer 114 covers the thin-film transistor 112 and the first substrate 11. The pixel electrodes 113 are located on the insulating layer 114.

Please refer to FIG. 1. The color filter substrate 12 further includes a second substrate 122, and the color filter layer 121 is disposed on a side of the second substrate 122 adjacent to the liquid crystal layer 13.

Figure 2:
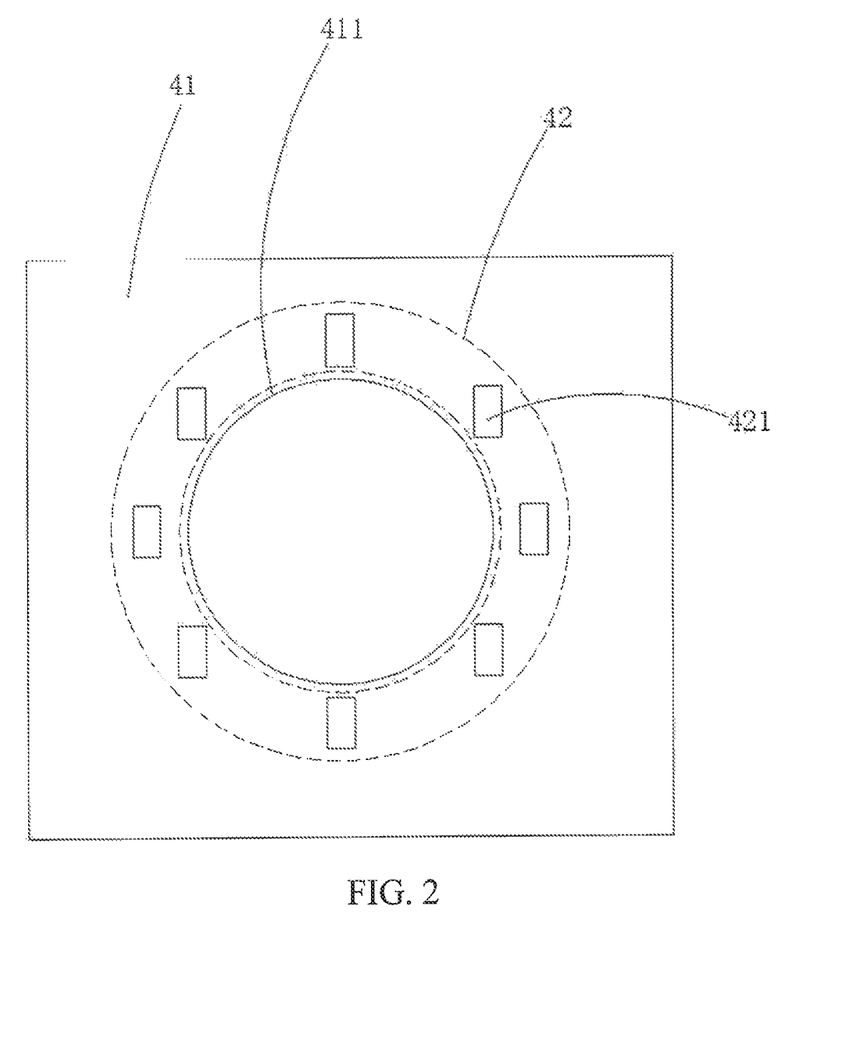
FIG. 2 is a schematic partial top plan view of a first light source component of a backlight module of a liquid crystal display device of the present application.

Please refer to FIGS. 1 and 2. The first light source component 42 is annular in shape and includes a plurality of first sub-light sources 421 spaced apart from each other in sequence. Each of the first sub-light sources 421 has a light-emitting surface facing the area of the liquid crystal display panel 10 corresponding to the first opening 411. Each of the first sub-light sources 421 sequentially emits red light, green light, and blue light to the area of the liquid crystal display panel 10 corresponding to the first opening 411 according to the first driving signal.

The second light source component includes a plurality of second sub-light sources spaced apart from each other in sequence. Each of the second sub-light sources emits white light to the liquid crystal display panel 10 except for the area of the liquid crystal display panel corresponding to the first opening 411 according to the second driving signal.

In this embodiment, the first sub-light sources 421 are tri-color light-emitting diodes (LEDs) provided for sequentially emitting red light, green light, and blue light. Alternatively, the first sub-light sources 421 include a red-light light-emitting diode, a green-light light-emitting diode, and a blue-light light-emitting diode sequentially disposed. By making the red-light LED, the green-light LED, and the blue-light LED alternately and separately emit light sequentially, the first sub-light sources 421 can sequentially generate red, green, and blue light.

In this embodiment, when a backlight source located at an area of the liquid crystal display panel 10 corresponding to the first opening 411 sequentially emits red light, green light, and blue light according to the first driving signal output by the first driving circuit board 422, liquid crystals at a corresponding position rotate different degrees according to an image color to be displayed to control a composition ratio of red, green and blue of a pixel at the corresponding position. White light of a backlight source of a pixel at an area of the liquid crystal display panel except for the area of the liquid crystal display panel 10 corresponding to the first opening 411 is provided to determine a composition ratio of red, green, and blue of a color to be displayed through control of rotation of liquid crystals of three pixels.

In this embodiment, the area of the liquid crystal display panel 10 corresponding to the first opening 411 has a backlight frequency not the same as an image displayed on the liquid crystal display panel 10 except for the area of the liquid crystal display panel corresponding to the first opening 411, For example, when a red sub-pixel, a green sub-pixel, and a blue sub-pixel in a conventional display area jointly display a frame of image data, each of a red LED, a green LED, and a blue LED in the area corresponding to the first opening 411 is sequentially turned on with one third of a frame time, so that a complete frame of image data can be displayed. Therefore, a backlight refresh rate of the area corresponding to the first opening 411 is three times that of a normal display area. When a refresh rate of the conventional display area is 60 Hz, a refresh rate corresponding to the area corresponding to the first opening 411 is 180 Hz.

In this embodiment, the area of the liquid crystal display panel 10 corresponding to the first opening 411 has a backlight frequency the same as an image displayed on the liquid crystal display panel 10 except for the area of the liquid crystal display panel corresponding to the first opening 411, For example, each of a red sub-pixel, a green sub-pixel, and a blue sub-pixel in prior art is turned on with a frame time. The present application enables a red sub-pixel, a green sub-pixel, and a blue sub-pixel in a conventional display area to be refreshed three times during a frame time. Each of the red LED, the green LED, and the blue LED in the area corresponding to the first opening 411 is sequentially turned on with one third of a frame time, so that a complete frame of image data can be displayed. Therefore, a refresh rate of the area corresponding to the first opening 411 is the same as that of a normal display area. For example, when a refresh rate of a conventional display area is 180 Hz, a refresh rate corresponding to the area corresponding to the first opening 411 is 180 Hz.

In this application, a display panel is provided to output a refresh rate of different frame rates or the same fame rates for displaying, so that an image displayed in the area of the liquid crystal display panel 10 corresponding to the first opening 411 is consistent with other areas. Consecutive color image frames make up continuous color images. Due to visual persistence characteristics of human eyes, the human eyes see a complete and smooth color image composed of three primary colors of blue, green and red, and the image is clear and bright. The area of the liquid crystal display panel 10 corresponding to the first opening 411 does not need a color film layer, thereby improving display effects of the display panel.

In this embodiment, the backlight module body 41 is a mini-LED direct-lit backlight module, and includes a direct-lit backlight and a diffusion plate (not shown) provided above the direct-lit backlight. The diffusion plate is provided with a first opening 411 disposed on the diffusion plate, and a first light source component 42 is disposed on the diffusion plate. The backlight module body 41 may also be a commonly used side-type backlight module, including a light guide plate and an edge-type backlight source (not shown) provided on one side of the light guide plate. The first light source component 42 is disposed on the light guide plate.

Please refer to FIGS. 1 and 2. In the first embodiment of the present application, the first light source component 42 is located on a side of the backlight module body 41 adjacent to the liquid crystal display panel 10 and surrounds an outside of the first opening 411.

Figure 3:
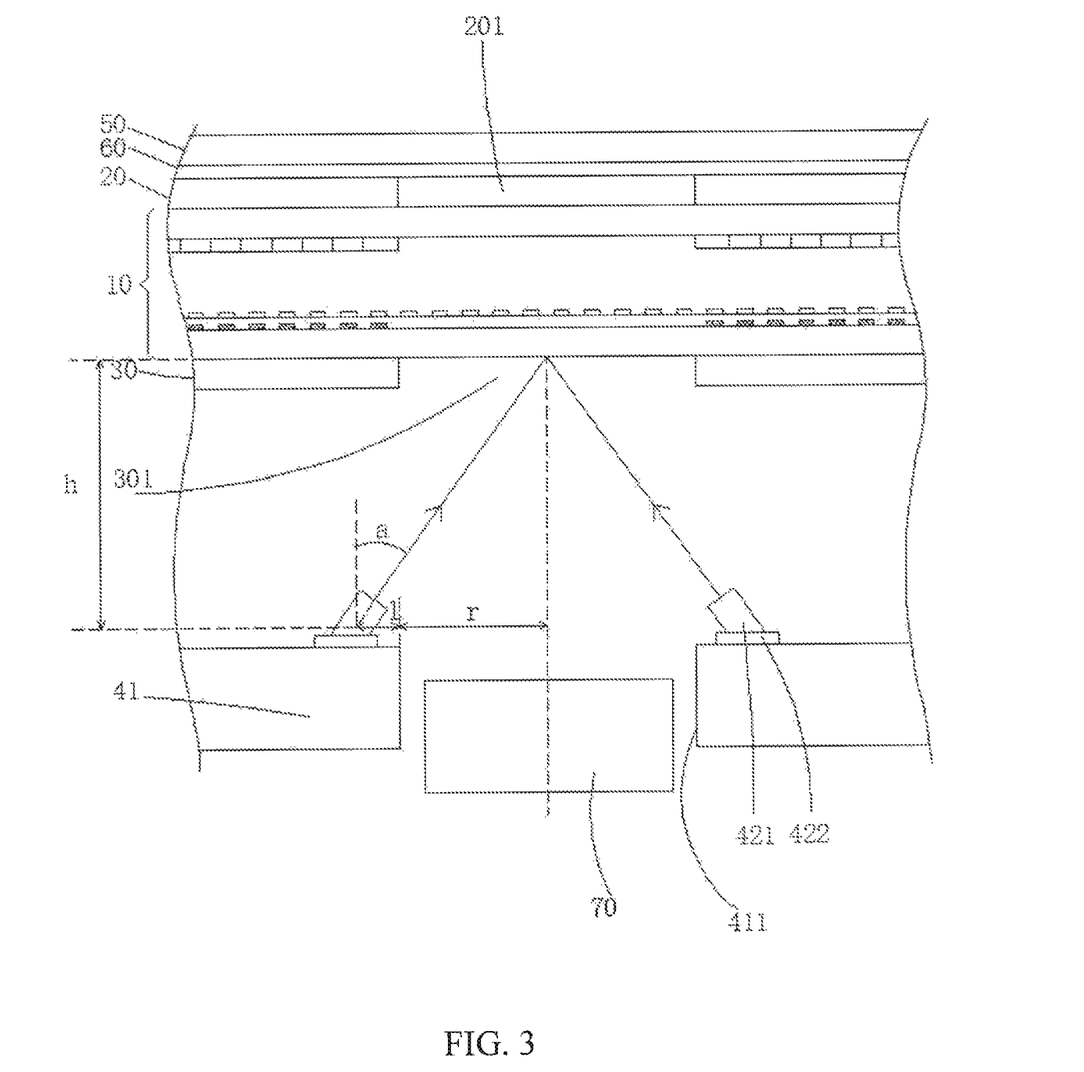
FIG. 3 is a schematic view showing a first optical path of a first light source component in a liquid crystal display device of the present application.

Please refer to FIGS. 1 to 3. The first opening 411 is a circular hole. Please refer to FIG. 3. Light emitted from a center of the light-emitting surface of any of the first sub-light sources 421 intersects a center line of the first opening 411. In order to ensure that brightness of the area of the liquid crystal display panel 10 corresponding to the first opening 411 is uniform, in the first embodiment of the present application, any of the first sub-light sources 421 has a light output direction intersects a direction perpendicular to a plan corresponding to the liquid crystal display panel 10 to form an angle, that is, a tilt angle of any of the first sub-light sources 421 with respect to the direction perpendicular to the plan corresponding to the liquid crystal display panel 10 satisfies a relationship as follows:

$a \leq \arctan[(l+r)/h]$, wherein a represents the angle between the light output direction of any of the first sub-light sources 421 and the direction perpendicular to the plan corresponding to the liquid crystal display panel 10, l represents a distance between a center of any of the first sub-light sources 421 and a side wall of the backlight module body 41 surrounding the first opening 411, r represents a radius of the first opening 411, and h represents a distance between the center of any of the first sub-light sources 421 and the liquid crystal display panel 10.

Please refer to FIG. 1. The liquid crystal display device further includes an upper polarizer 20 and a lower polarizer 30 disposed on two sides of the liquid crystal display panel, a cover 50 disposed on a side of the upper polarizer 20 away from the liquid crystal display 10, an optical adhesive 60 provided between the cover 50 and the upper polarizer 20, and a camera 70 disposed on a side of the lower polarizer 30 away from the liquid crystal display panel 10 and corresponding to the first opening 411. The camera 70 may be disposed on a side of the backlight module 40 away from the liquid crystal display panel 10. Alternatively, part or all of the camera 70 may be placed in the first opening 411 of the backlight module body 41.

In this embodiment, the lower polarizer 30 is provided with a third opening 301 corresponding to the first opening 411, and the upper polarizer 20 is provided with a fourth opening 201 corresponding to the first opening 411.

In this embodiment, liquid crystal molecules in the liquid crystal layer 13 may be arranged in partitions. The liquid crystal layer 13 corresponding to the first opening 411 may be a scattering liquid crystal, and the liquid crystal layer 13 corresponding to an area other than the first opening 411 may be a conventional liquid crystal. The scattering liquid crystal generally includes a plurality of liquid crystal molecules and polymers, and can realize switching between a transparent state and an image display state.

In this embodiment, in a condition that the liquid crystal and the polymer have a same anisotropic dielectric constant, and when no voltage is applied or a voltage is lower than a threshold voltage, the liquid crystal molecules are aligned horizontally, and there is no refractive index difference with a polymer material inside, so no scattering occurs. When a voltage applied is higher than a threshold voltage, the liquid crystal molecules rotate and their directions are aligned along a vertical direction, thereby changing anisotropic characteristics of a dielectric constant of the liquid crystal. Therefore, a refractive index difference occurs on a surface of the liquid crystal and the polymer, so that light scatters and can be seen by users.

In this embodiment, the liquid crystal layer 13 may be provided as a whole layer. A material of the liquid crystal layer 13 may be a phase liquid crystal. In this application, different voltage control can be applied to phases in different areas, and image display on an area corresponding to the first opening 411 can be implemented.

Alternatively, the lower polarizer 30 and the upper polarizer 20 corresponding to the first opening 411 remain, that is, the third opening 301 and the fourth opening 201 are removed. A material of the liquid crystal layer 13 in such an embodiment may be selected as a conventional liquid crystal.

A material of the liquid crystal layer in the present application is not limited to the above.

In this embodiment, except for the area of the liquid crystal display panel corresponding to the first opening 411, a polarization axis of the upper polarizer 20 is perpendicular to a polarization axis of the lower polarizer 30.

Figure 5:
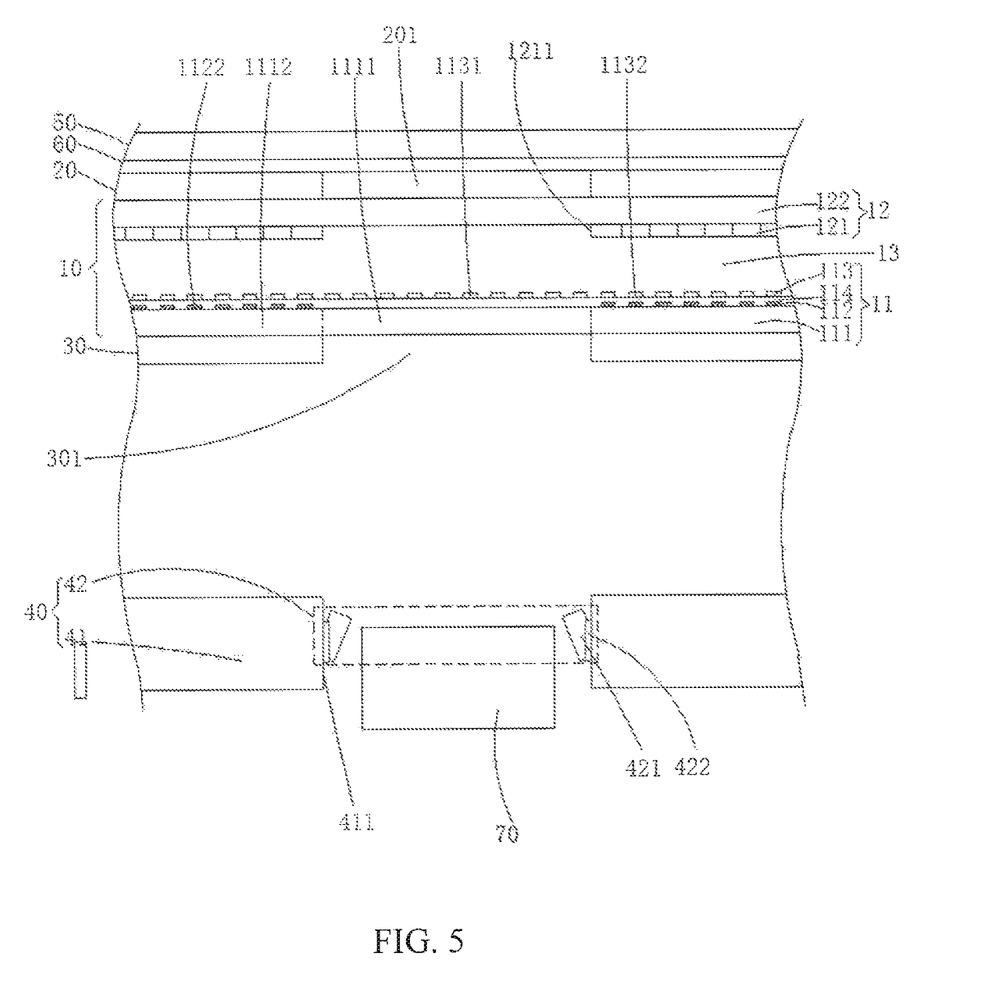
FIG. 5 is a second schematic cross-sectional view of a liquid crystal display device of the present application.
Figure 6:
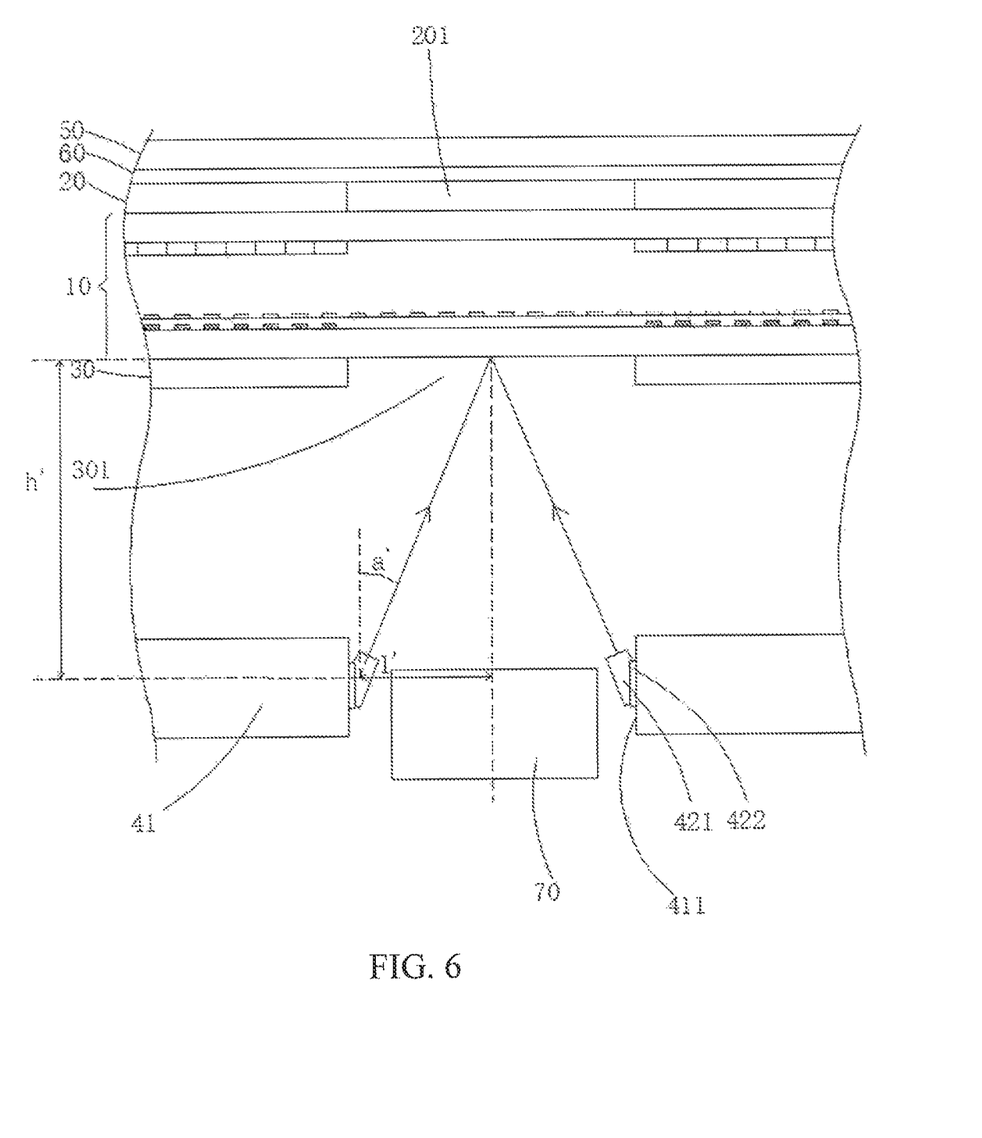
FIG. 6 is a schematic view showing a second optical path of a first light source component in a liquid crystal display device of the present application.

Please refer to FIGS. 5 and 6. A liquid crystal display device in the second embodiment of the present application is different from the first embodiment described above in that a first light source component 42 is located on a side wall of the backlight module body 41 surrounding the first opening 411.

Please refer to FIGS. 5 and 6. The first opening 411 is a circular hole. Light emitted from a center of the light-emitting surface of any of the first sub-light sources 421 intersects a center line of the first opening 411. In order to ensure that brightness of the area of the liquid crystal display panel 10 corresponding to the first opening 411 is uniform, in the second embodiment of the present application, any of the first sub-light sources 421 has a light output direction intersects a direction perpendicular to a plan corresponding to the liquid crystal display panel 10 to form an angle, that is, a tilt angle of any of the first sub-light sources 421 with respect to the direction perpendicular to the plan corresponding to the liquid crystal display panel 10 satisfies a relationship as follows:

$a' \leq \arctan(l'/h')$, wherein a' represents the angle between the light output direction of any of the first sub-light sources 421 and the direction perpendicular to the plan corresponding to the liquid crystal display panel 10, l' represents a distance between a center of any of the first sub-light sources 421 and the center line of the first opening 411, and h' represents a distance between the center of any of the first sub-light sources 421 and the liquid crystal display panel 10, and others remain the same as the first embodiment.

In the second embodiment of the present application, the first light source component 42 is disposed on the side wall of the backlight module body 41 surrounding the first opening 411 by using a packaging method such as a chip scale package (CSP). It should be noted that during a specific process in the second embodiment of the present application, the light-emitting surface of any of the first sub-light sources 421 of the first light source component 42 is arranged to face the area of the liquid crystal display panel 10 corresponding to the first opening 411 by a packaging method. Furthermore, in configuring a whole module, a frame covering an outer periphery of the backlight module 40 is spaced at a predetermined distance from the side wall of the backlight module 40 surrounding the first opening 411, wherein the predetermined distance, for example, may be greater than 0.2 millimeters (mm), in order to accommodate the plurality of first sub-light sources 421 of the first light source component 42.

It should be noted that when the liquid crystal display device is in a camera mode, external light can directly enter the camera 70 through the area corresponding to the first opening 411, so as to capture the light by the camera 70. In addition, in the present application, a plurality of first thin-film transistors 1121 for driving a plurality of first pixel electrodes 1131 corresponding to the first openings 411 are disposed in the sealant area 1113 of the first substrate 111, and each of the first thin-film transistors 1112 is electrically connected to at least a corresponding one of the first pixel electrodes 1131. That is, an area corresponding to the first opening 411 on the array substrate 11 is not provided with a thin-film transistor, thereby improving an aperture ratio and light transmittance of the area of the liquid crystal display panel 10 corresponding to the first opening 411, and increasing an amount of light entering the camera 70 when shooting with the camera 70, so that imaging quality is improved.

In a state where the liquid crystal display device is normally displayed, although the color filter layer 121 is provided with the second opening 1211 corresponding to the first opening 411, the present application utilizes the first light source component 42 to sequentially emit red, green, and blue light to the area of the liquid crystal display panel 10 corresponding to the first opening 411, and adopts a field sequential color (FSC) method technology, a plurality of pixels corresponding to the plurality of first pixel electrodes 1131 in the liquid crystal display panel 10 can display red, green and blue through a time-division manner for superposition, and specific colors are presented in the end, so that an area of the liquid crystal display device corresponding to the camera 70 can also display color images, thereby improving product quality.

The present application provides a liquid crystal display device, including a liquid crystal display panel and a backlight module. The backlight module includes a backlight module body a first light source component, and a second light source component. The backlight module body is provided with a first opening. The first light source component is disposed on the backlight module body and corresponds to the first opening. When the liquid crystal display panel is displaying, the first light source sequentially emits red light, green light, and blue light to an area of the liquid crystal display panel corresponding to the first opening, and the second light source emits light to the liquid crystal display panel except for the area of the liquid crystal display panel corresponding to the first opening, thereby enabling normal color display in the area of the liquid crystal display device corresponding to the camera, and achieving higher product quality.

It can be understood that, for those skill in the art, equivalent replacements or changes can be made according to the technical solution of the present application and its inventive concept, and thus the scope of the present invention should be after the appended claims and their equivalents.

What is claimed is:

1. A liquid crystal display device, comprising:
a liquid crystal display panel comprising an array substrate and a color filter substrate disposed corresponding to each other, and a liquid crystal layer disposed between the array substrate and the color filter substrate; and
a backlight module disposed on a side of the liquid crystal display panel, wherein the backlight module comprises:
a backlight module body provided with a first opening corresponding to a second opening defined in the color filter substrate;
a first light source component disposed on the backlight module body and corresponding to the first opening, wherein the first light source component is annular in shape and comprises a light-emitting surface facing an area of the liquid crystal display panel corresponding to the first opening, a first driving circuit board, a first light source, and a plurality of first sub-light sources spaced apart from each other in sequence, wherein any of the first sub-light sources has a light-emitting surface facing the area of the liquid crystal display panel corresponding to the first opening, and any of the first sub-light sources sequentially emits red light, green light, and blue light to the area of the liquid crystal display panel corresponding to the first opening according to the first driving signal; and
a second light source component comprising a second driving circuit board, a second light source, and a plurality of second sub-light sources spaced apart from each other in sequence, wherein any of the second sub-light sources emits white light to the liquid crystal display panel except for the area of the liquid crystal display panel corresponding to the first opening according to the second driving signal;
wherein when the liquid crystal display panel is displaying, the first driving circuit board outputs a first driving signal so that the first light source sequentially emits red light, green light, and blue light to the area of the liquid crystal display panel corresponding to the first opening, and the second driving circuit board outputs a second driving signal so that the second light source emits light to the liquid crystal display panel except for the area of the liquid crystal display panel corresponding to the first opening.

2. The liquid crystal display device of claim 1, wherein the area of the liquid crystal display panel corresponding to the first opening has a backlight frequency the same as an image displayed on the liquid crystal display panel except for the area of the liquid crystal display panel corresponding to the first opening.

3. The liquid crystal display device of claim 1, wherein the first light source component is located on a side of the backlight module body adjacent to the liquid crystal display panel and surrounds an outside of the first opening.

4. The liquid crystal display device of claim 3, wherein the first opening is a circular hole, light emitted from a center of the light-emitting surface of any of the sub-light sources intersects a center line of the first opening, and any of the sub-light sources has a light output direction intersects a direction perpendicular to a plan corresponding to the liquid crystal display panel to form an angle, wherein the angle satisfies the relationship: $a \leq \arctan[(l+r)/h]$, wherein a represents the angle between the light output direction of any of the sub-light sources and the direction perpendicular to the plan corresponding to the liquid crystal display panel, l represents a distance between a center of any of the sub-light sources and a side wall of the backlight module body surrounding the first opening, r represents a radius of the first opening, and h represents a distance between the center of any of the sub-light sources and the liquid crystal display panel.

5. The liquid crystal display device of claim 1, wherein the first light source component is disposed on a side wall of the backlight module body surrounding the first opening.

6. The liquid crystal display device of claim 5, wherein the first opening is a circular hole, light emitted from a center of the light-emitting surface of any of the sub-light sources intersects a center line of the first opening, and any of the sub-light sources has a light output direction intersects a direction perpendicular to a plan corresponding to the liquid crystal display panel to form an angle, wherein the angle satisfies the relationship: a'≤arctan(l'/h'), wherein a' represents the angle between the light output direction of any of the sub-light sources and the direction perpendicular to the plan corresponding to the liquid crystal display panel, l' represents a distance between a center of any of the sub-light sources and the center line of the first opening, and h' represents a distance between the center of any of the sub-light sources and the liquid crystal display panel.

7. The liquid crystal display device of claim 1, wherein the plurality of sub-light sources are tri-color light-emitting diodes provided for sequentially emitting red light, green light, and blue light, or the plurality of sub-light sources comprise a red-light light-emitting diode, a green-light light-emitting diode, and a blue-light light-emitting diode sequentially disposed.

8. The liquid crystal display device of claim 1, wherein the array substrate comprises a first substrate and a plurality of thin-film transistors and a plurality of pixel electrodes disposed on a side of the first substrate adjacent to the liquid crystal layer, wherein the first substrate comprises a camera area corresponding to the first opening, a display area located outside the camera area, and a sealant area located outside the display area, wherein the pixel electrodes comprise a plurality of first pixel electrodes located at the camera area, the thin-film transistors comprise a plurality of first thin-film transistors located at the sealant area, and each of the first thin-film transistors is electrically connected to at least a corresponding one of the first pixel electrodes.

9. A liquid crystal display device, comprising:
a liquid crystal display panel comprising an array substrate and a color filter substrate disposed corresponding to each other, and a liquid crystal layer disposed between the array substrate and the color filter substrate; and
a backlight module disposed on a side of the liquid crystal display panel, wherein the backlight module comprises:
a backlight module body provided with a first opening corresponding to a second opening defined in the color filter substrate;
a camera disposed corresponding to the first opening;
a first light source component disposed on the backlight module body and corresponding to the first opening, wherein the first light source component comprises a light-emitting surface facing an area of the liquid crystal display panel corresponding to the first opening, a first driving circuit board, and a first light source; and
a second light source component comprising a second driving circuit board and a second light source;
wherein the array substrate comprises a first substrate and a plurality of thin-film transistors and a plurality of pixel electrodes disposed on a side of the first substrate adjacent to the liquid crystal layer, wherein the first substrate comprises a camera area corresponding to the first opening, a display area located outside the camera area, and a sealant area located outside the display area, wherein the pixel electrodes comprise a plurality of first pixel electrodes located at the camera area, the thin-film transistors comprise a plurality of first thin-film transistors located at the sealant area, and each of the first thin-film transistors is electrically connected to at least a corresponding one of the first pixel electrodes;
wherein when the liquid crystal display panel is displaying, the first driving circuit board outputs a first driving signal so that the first light source sequentially emits red light, green light, and blue light to the area of the liquid crystal display panel corresponding to the first opening, and the second driving circuit board outputs a second driving signal so that the second light source emits light to the liquid crystal display panel except for the area of the liquid crystal display panel corresponding to the first opening.

10. The liquid crystal display device of claim 9, wherein the first light source component is annular in shape and comprises a plurality of first sub-light sources spaced apart from each other in sequence, wherein any of the first sub-light sources has a light-emitting surface facing the area of the liquid crystal display panel corresponding to the first opening, and any of the first sub-light sources sequentially emits red light, green light, and blue light to the area of the liquid crystal display panel corresponding to the first opening according to the first driving signal; and the second light source component comprises a plurality of second sub-light sources spaced apart from each other in sequence, wherein any of the second sub-light sources emits white light to the liquid crystal display panel except for the area of the liquid crystal display panel corresponding to the first opening according to the second driving signal.

11. The liquid crystal display device of claim 10, wherein the area of the liquid crystal display panel corresponding to the first opening has a backlight frequency the same as an image displayed on the liquid crystal display panel except for the area of the liquid crystal display panel corresponding to the first opening.

12. The liquid crystal display device of claim 10, wherein the first light source component is located on a side of the backlight module body adjacent to the liquid crystal display panel and surrounds an outside of the first opening.

13. The liquid crystal display device of claim 12, wherein the first opening is a circular hole, light emitted from a center of the light-emitting surface of any of the sub-light sources intersects a center line of the first opening, and any of the sub-light sources has a light output direction intersects a direction perpendicular to a plan corresponding to the liquid crystal display panel to form an angle, wherein the angle satisfies the relationship: a≤arctan[(l+r)/h], wherein a represents the angle between the light output direction of any of the sub-light sources and the direction perpendicular to the plan corresponding to the liquid crystal display panel, l represents a distance between a center of any of the sub-light sources and a side wall of the backlight module body surrounding the first opening, r represents a radius of the first opening, and h represents a distance between the center of any of the sub-light sources and the liquid crystal display panel.

14. The liquid crystal display device of claim 10, wherein the first light source component is disposed on a side wall of the backlight module body surrounding the first opening.

15. The liquid crystal display device of claim 14, wherein the first opening is a circular hole, light emitted from a center of the light-emitting surface of any of the sub-light sources intersects a center line of the first opening, and any of the sub-light sources has a light output direction intersects a direction perpendicular to a plan corresponding to the liquid crystal display panel to form an angle, wherein the angle satisfies the relationship: a'≤arctan(l'/h'), wherein a' represents the angle between the light output direction of any of the sub-light sources and the direction perpendicular to the plan corresponding to the liquid crystal display panel, l' represents a distance between a center of any of the sub-light sources and the center line of the first opening, and h' represents a distance between the center of any of the sub-light sources and the liquid crystal display panel.

16. The liquid crystal display device of claim 10, wherein the plurality of sub-light sources are tri-color light-emitting diodes provided for sequentially emitting red light, green light, and blue light, or the plurality of sub-light sources comprise a red-light light-emitting diode, a green-light light-emitting diode, and a blue-light light-emitting diode sequentially disposed.

17. The liquid crystal display device of claim 9, wherein the liquid crystal display device further comprises:
an upper polarizer and a lower polarizer disposed on two sides of the liquid crystal display panel;
a cover disposed on a side of the upper polarizer away from the liquid crystal display;
an optical adhesive provided between the cover and the upper polarizer; and
a camera disposed on a side of the lower polarizer away from the liquid crystal display panel and corresponding to the first opening;
wherein the lower polarizer is provided with a third opening corresponding to the first opening, and the upper polarizer is provided with a fourth opening corresponding to the first opening.

18. A liquid crystal display device, comprising:
a liquid crystal display panel comprising an array substrate and a color filter substrate disposed corresponding to each other, and a liquid crystal layer disposed between the array substrate and the color filter substrate; and
a backlight module disposed on a side of the liquid crystal display panel, wherein the backlight module comprises:
a backlight module body provided with a first opening corresponding to a second opening defined in the color filter substrate;
a first light source component disposed on the backlight module body and corresponding to the first opening, wherein the first light source component comprises a light-emitting surface facing an area of the liquid crystal display panel corresponding to the first opening, a first driving circuit board, and a first light source;
a second light source component comprising a second driving circuit board and a second light source;
an upper polarizer and a lower polarizer disposed on two sides of the liquid crystal display panel, wherein a third opening is defined in the lower polarizer and corresponds to the first opening, and a fourth opening is defined in the upper polarizer and corresponds to the first opening;
a cover disposed on a side of the upper polarizer away from the liquid crystal display;
an optical adhesive provided between the cover and the upper polarizer; and
a camera disposed on a side of the lower polarizer away from the liquid crystal display panel and corresponding to the first opening;
wherein when the liquid crystal display panel is displaying, the first driving circuit board outputs a first driving signal so that the first light source sequentially emits red light, green light, and blue light to the area of the liquid crystal display panel corresponding to the first opening, and the second driving circuit board outputs a second driving signal so that the second light source emits light to the liquid crystal display panel except for the area of the liquid crystal display panel corresponding to the first opening.

19. The liquid crystal display device of claim 18, wherein the array substrate comprises a first substrate and a plurality of thin-film transistors and a plurality of pixel electrodes disposed on a side of the first substrate adjacent to the liquid crystal layer, wherein the first substrate comprises a camera area corresponding to the first opening, a display area located outside the camera area, and a sealant area located outside the display area, wherein the pixel electrodes comprise a plurality of first pixel electrodes located at the camera area, the thin-film transistors comprise a plurality of first thin-film transistors located at the sealant area, and each of the first thin-film transistors is electrically connected to at least a corresponding one of the first pixel electrodes.

* * * * *